Sept. 2, 1969  E. C. LLOYD  3,464,256

DOUBLE PISTON GAGE

Filed April 2, 1968

INVENTOR

E. C. Lloyd

BY Alvin J. Englert

AGENT

United States Patent Office 3,464,256
Patented Sept. 2, 1969

3,464,256
DOUBLE PISTON GAGE
Edward C. Lloyd, Potomac, Md., assignor to the United States of America as represented by the Secretary of Commerce
Filed Apr. 2, 1968, Ser. No. 718,060
Int. Cl. G01l 27/00, 7/16
U.S. Cl. 73—4                                      3 Claims

ABSTRACT OF THE DISCLOSURE

A pair of pistons are fitted in vertical cylinders. One of the pistons is loaded with a predetermined amount of weight, its upper side is connected to a vacuum pump, and its lower side is connected to a source of pressure that is adjusted to balance the piston, whereby the pressure is equal to the total load divided by the area of the piston. The pressure source is also connected to the lower side of the other piston, urging it upward. This piston is balanced by applying the pressure to be measured to the upper side of the piston and by loading the piston with weights, whereby the unknown pressure is equal to the predetermined pressure minus the pressure due to the total weight load acting on the area of this piston. The unknown pressure may vary from zero absolute pressure up to any desired pressure such as several atmospheres.

BACKGROUND OF THE INVENTION

This invention relates to fluid pressure gages, and more particularly to deadweight-loaded piston gages.

Deadweight-loaded piston gages are widely used to calibrate fluid pressure instruments. In general, prior piston gages cannot measure pressures down to zero absolute, due to the tare weight of the piston. Although the effective tare weight of the piston can be reduced by inclining the cylinder axis from the vertical, it is difficult to maintain proper lubrication of the (rotating) piston, due to the small pressure differential along the piston produced by the vacuum on the upper side of the piston, and the near-vacuum on the lower side.

SUMMARY OF THE INVENTION

This invention provides a piston gage capable of measuring pressures down to zero absolute. In brief, this is accomplished by providing a pair of pistons in vertical cylinders, one of the pistons being utilized to establish a reference pressure that is applied to the lower side of the other piston. The unknown pressure is applied to the upper side of the piston, and the piston is loaded with weights to obtain equilibrium. Since the weight load by itself can be adjusted to balance the reference pressure, the unknown pressure clearly can approach zero absolute pressure. In this arrangement, the reference pressure on the lower side of the piston and the near vacuum on the upper side establish a lubricating flow of fluid along the piston, thereby obviating the lubrication problem suffered by prior piston gages when measuring very small absolute pressures.

DESCRIPTION OF THE PREFERRED EMBODIMENTS

Figure 1:
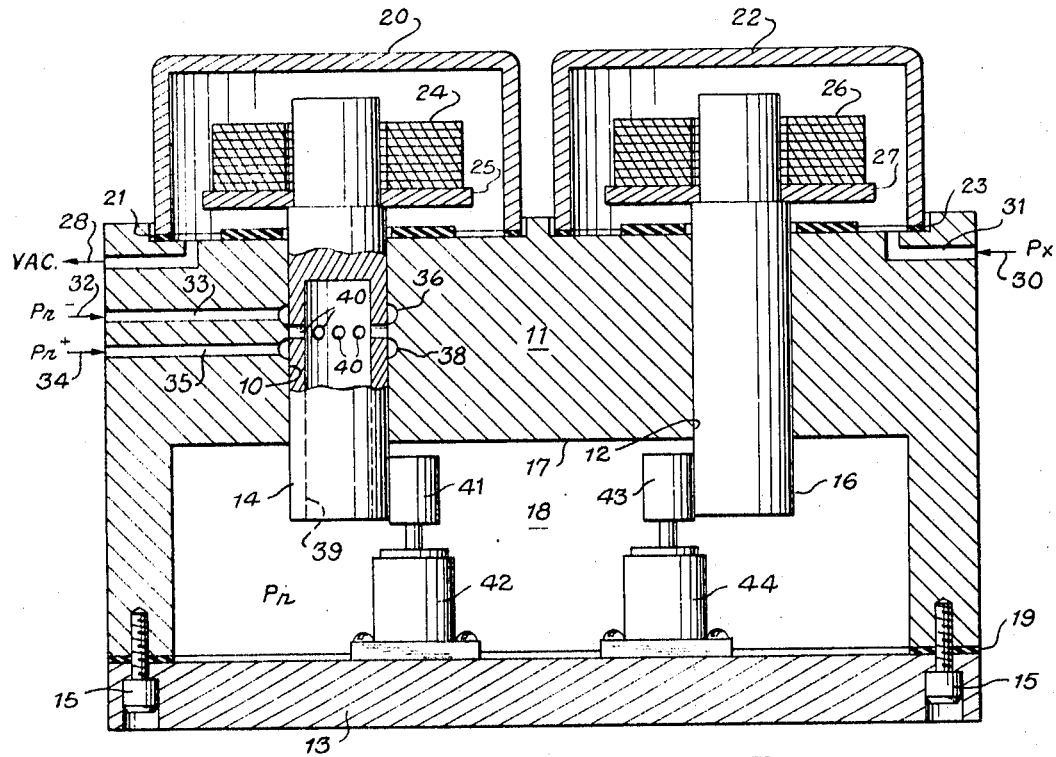
FIG. 1 is a cross sectional view of one embodiment of the invention.

As shown in FIG. 1, the double piston gage of this invention includes a pair of vertical cylinders 10, 12 that receive a pair of pistons 14, 16. The cylinders 10, 12 are formed in a block 11 which is secured to a horizontal base 13 by screws 15. The under surface of the block 11 is recessed, as shown at 17, to form an enclosure 18 into which the lower ends of pistons 14, 16 project. The enclosure 18 is made fluid-tight by a gasket 19.

The upper ends of the pistons 14, 16 extend above the block 11 and are separately enclosed, in fluid-tight manner, by cup-shaped covers 20, 22 and gaskets 21, 23. Within the covers 20, 22 the pistons 14, 16 are provided with annular supports 25, 27 that receive annular weights 24, 26.

The upper side of piston 14 is connected to a vacuum pump 28 by a passageway formed in the block 11. The upper side of piston 16 is connected to the source 30 of unknown pressure $P_x$ by a passageway 31 also formed in the block 11.

The lower sides of both of the pistons 14, 16 are subjected to a predetermined reference pressure $P_r$ greater than the maximum expected value of the unknown pressure $P_x$. The predetermined pressure $P_r$ is established in the enclosure 18 by loading piston 14 with sufficient weights 24 so that the sum of the weights 24 and the weight of the piston 14, divided by the area of the piston 14, equals the predetermined pressure $P_r$. This pressure is maintained in the enclosure 18 by two sources 32, 34 of contstant pressures $P_r^-$, $P_r^+$, where $P_r^-$ is slightly less than the predetermined pressure $P_r$, and $P_r^+$ is slightly greater. These sources are selectively connected to the enclosure 18 by passageways 33, 35 which terminate in annular upper and lower grooves 36, 38 formed in the wall of cylinder 10, and by an annular set of ports 40 formed in piston 14, the ports 40 being connected to the enclosure 18 by a passageway 39 formed in the piston 14. In this arrangement, when the pressure in enclosure 18 tends to fall below the predetermined pressure $P_r$, piston 14 moves down, causing ports 40 to communicate with the lower annular groove 38, whereby fluid moves from source 34 of pressure $P_r^+$ into the enclosure 18. As sufficient fluid moves into the enclosure 18 to restore the pressure therein to $P_r$, the piston 14 moves up and the ports 40 are closed by the cylinder wall between the grooves 36, 38. In a similar fashion, when the pressure in enclosure 18 rises above the pressure $P_r$, piston 14 moves up, causing fluid to move from the enclosure 18 to the source 32 of pressure $P_r^-$, until pressure $P_r$ is re-established in the enclosure 18.

The lower edge of groove 36 should be spaced from the upper edge of groove 38 a distance substantially equal to the diameter of the ports 40, so that slight vertical movements of piston 14 result in immediate corrective transfers of fluid between the enclosure 18 and sources 32, 34. Those skilled in the art will recognize that the ports 40 could be other than circular, for example, diamond-shaped, and that the ports could slightly communicate with both grooves 36, 38 when positioned midway therebetween, in order to reduce any tendency of the piston 14 to oscillate vertically or "hunt" for the balance condition.

The sources 32, 34 of constant pressure may be of any known construction, and preferably comprise barostats of the construction shown at pages 25 and 26 of National Bureau of Standards Monograph 8, issued May 20, 1960. In this connection, it should be noted that the piston 14 and associated ports 40 of the present invention enable the pressure in enclosure 18 to be regulated with a precision that is much greater than the precision with which the sources 32, 34 (barostats) regulate their respective pressures. It will become clear that the accuracy and precision of the double piston gage of this invention is dependent on the provision of a precise, stable reference pressure in the enclosure 18, which is readily provided by the ported piston 14 of this invention.

As mentioned above, the source 30 of unknown pressure $P_x$ is connected to the upper side of piston 16, and piston 16 carries annular weights 26. If the pressure $P_x$ is a fixed unknown whose magnitude is to be determined, the weights 26 are adjusted until the pressure produced by the total load (piston and weights) acting on the area of piston 16, together with the unknown pressure $P_x$, balance the reference pressure $P_r$ applied to the lower end of piston 16, the balance being indicated by the lack of vertical movement of the piston 16. With this condition, the unknown pressure $P_x$ is given by the difference between the reference pressure and the pressure due to the deadweight load.

If the pressure $P_x$ is a variable pressure that is connected to a pressure instrument to be calibrated, the weights 26 on piston 16 are adjusted to provide a total load and resultant pressure which, when substracted from the reference pressure, equals a desired calibration pressure. The variable unknown pressure $P_x$ is then varied to balance the piston 16, whereupon $P_x$ equals the calibration pressure.

It will now be apparent that the unknown pressure $P_x$ can be reduced toward absolute zero, since as the weight load applied to piston 16 increases, the pressure $P_x$ required to balance the piston decreases. When the weight load alone balances the upward acting reference pressure, the unknown pressure $P_x$ equals zero. Importantly, when $P_x$ equals zero, there is a substantial pressure differential across the piston 16, inasmuch as the lower face is subjected to the relatively large reference pressure $P_r$ in enclosure 18. This pressure differential across piston 16 provides fluid lubrication for the piston when it is rotated as described below.

In the double piston gage of this invention, the pressure-transmitting fluids may be liquids such as water, kerosene, or the like, but the gage is especially intended for use with gases such as air or nitrogen. When operating with gases, it is conventional practice to rotate the piston to which the gas is applied, in order to provide an air bearing between the piston and its cylinder, and thereby eliminate measuring errors due to friction. This invention contemplates the provision of suitable means for rotating the pistons 14, 16 in the cylinders 10, 12 of FIG. 1, as indicated by the motors 42, 44 which drive the pistons through rubber drive wheels 41, 43. Although not shown, it is desirable to provide means for disengaging the drive wheels from the pistons after the pistons have been brought up to speed, in order to allow the pistons to move freely during the observation of the balance condition.

When piston 16 is rotating and the unknown pressure $P_x$ is zero, the reference pressure $P_r$ in enclosure 18 causes sufficient fluid to flow up along the piston 16 to prevent stalling thereof, as frequently happens in prior piston gages. The prior gages connect the unknown pressures (near vacuum) to the lower side of a rotating piston, and a vacuum pump to the upper side of the piston, whereby the fluid molecules required for the air bearing are effectively removed from the system, causing stalling.

In the operation of the double piston gage shown in FIG. 1, the left piston 14 is loaded with weights 24 to provide the desired pressure $P_r$ in enclosure 18, and the right piston 16 is loaded with weights 26 to provide the pressure desired to be substracted from the reference pressure. The constant pressure sources 32, 34 are adjusted to provide pressures slightly less than, and slightly greater, the reference pressure. The sources 32, 34, the vacuum pump 28, and the unknown pressure source 30 are connected to their respective passageways in the block 11, and the motors 42, 44 are turned on. When it is determined that the vacuum pump 28 has evacuated the space under the cover 20 to a negligible residual pressure, the motors 42, 44 are disengaged from the pistons, piston 14 is checked for equilibrium (no hunting) and piston 16 is checked for balance. If piston 16 is not balanced, $P_x$ is adjusted to achieve balance; or, the system is stopped, the weights 26 adjusted, and the system is restrated, until the piston 16 achieves a balance with the (fixed) unknown pressure $P_x$.

Figure 2:
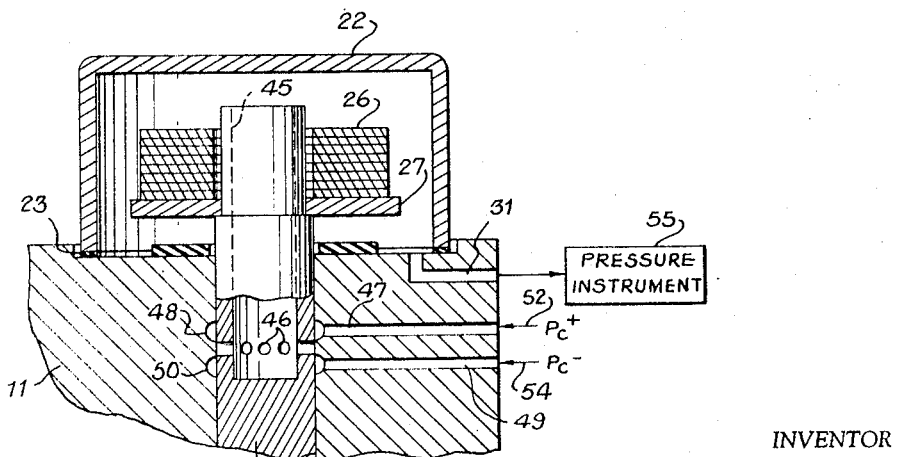
FIG. 2 is a cross sectional view of a portion of the right piston of FIG. 1, in accordance with an alternative embodiment of the invention.

In the above-described operation, when the unknown pressure source 30 is variable, in order to calibrate pressure instruments, it will be apparent that it would be desirable to modify the gage to provide a predetermined fixed pressure which could be used for calibration without any further adjustment. FIG. 2 illustrates such a modification of the double piston gage. In FIG. 2, the piston 16 is provided with an annular set of ports 46 and a passageway 45 which connects the ports 46 to the upper side of piston 16. Annular grooves 48, 50 formed in the wall of cylinder 12 are connected by passageways 47, 49 to sources 52, 54 of constant pressures $P_c{}^+$, $P_c{}^-$, where $P_c{}^+$ is slightly greater than the desired calibration pressure, and $P_c{}^-$ is slightly less. These ports, grooves, passageways, and sources (elements 45–54) are constructed similarly to their counterparts (elements 32–40) previously described with reference to FIG. 1.

In the operation of the gage shown in FIG. 2, the piston 16 is loaded with sufficient weights 26 to substract all but the desired calibration pressure $P_c$ from the reference pressure $P_r$ acting on the lower end of piston 16. The sources 52, 54 are adjusted to provide slightly greater and lesser pressures. Thus, when an instrument 55 to be calibrated is connected to the passageway 31, the reference pressure moves the piston 16 up, causing fluid to move from the source 52 through the passageway 47, groove 48, ports 46, and passageways 45 and 31 to the instrument 55. As the pressure under cover 22 approaches $P_c$, the pressure and the weights 26 move piston 16 downward against the reference pressure until the ports 46 are midway between the grooves 48, 50. Should the pressure under cover 22 rise above $P_c$, the piston 16 will move down and ports 46 will bleed some fluid to the source 54 until the pressure $P_c$ is restored. Thus the gage shown in FIG. 2 automatically provides a precise, preselected calibration pressure to the instrument (or instruments) 55.

The calibration pressure provided by the system of FIG. 2 can be decreased toward zero absolute, by simply increasing the weights 26 loaded on piston 16. Since the lower end of piston 16 is subjected to the reference pressure, there is an ample flow of lubricating fluid up along the rotating piston 16, even though there are near-vacuums at grooves 48, 50 and the top of piston 16.

The upper pressure limits of the gages shown in FIGS. 1 and 2 are set by the maximum reference pressures that can be established in the enclosure 18, since the unknown or calibrating pressures must be less than the reference pressure in order to obtain equilibrium. It will be readily apparent that the gages can be designed to handle reference pressures of several atmospheres or more, as desired, and hence the gages can operate over unusually wide ranges. In addition, it will be clear that the gages are rugged, easily portable, and relatively inexpensive.

It will be apparent that various modifications may be made in the preferred embodiments shown in FIGS. 1 and 2, without departing from the spirit and scope of the invention. For example, it will be clear that the weights 24, 26 could be suspended from the pistons 14, 16 within the enclosure 18, whereby the removable covers 20, 22 could be replaced with fixed covers or caps.

I claim:
1. A double piston gage comprising,
  first and second vertical cylinders,
  first and second pistons disposed in said first and second cylinders, respectively,
  means for loading said first piston with a predetermined weight, means for connecting the upper side of said first piston to a vacuum pump, means for applying a predetermined fluid pressure to the lower side of said first piston to balance said first piston, means for applying said predetermined fluid pressure to the lower side of said second piston, means for applying an unknown fluid pressure to the upper side of said second piston, and means for loading said second piston with weights to balance said second piston.

2. A double piston gage as set forth in claim 1, wherein said means for applying said predetermined fluid pressure to the lower side of said first piston comprises, upper and lower annular grooves formed in the cylindrical wall of said first cylinder, an annular set of ports formed in said first piston for communicating with one or the other of said annular grooves as said first piston slides in said first cylinder, a passageway connecting said set of ports to the lower side of said first piston, a source of constant fluid pressure slightly less than said predetermined fluid pressure being connected to said upper annular groove, and a source of constant fluid pressure slightly greater than said predetermined fluid pressure being connected to said lower annular groove.

3. A double piston gage as set forth in claim 2, wherein said means for applying an unknown fluid pressure to the upper side of said second piston comprises, upper and lower annular grooves formed in the cylindrical wall of said second cylinder, an annular set of ports formed in said second piston for communicating with one or the other of said annular grooves in said second cylinder as said second piston slides in said second cylinder, a passageway connecting said set of ports in said second piston to the upper side of said second piston, a source of constant fluid pressure slightly greater than a predetermined calibration pressure being connected to said upper annular groove in said second cylinder, and a source of constant fluid pressure slightly less than said predetermined calibration pressure being connected to said lower annular groove in said second cylinder.

References Cited

UNITED STATES PATENTS

| | | |
|---|---|---|
| 1,134,316 | 4/1915 | Collette. |
| 3,133,435 | 5/1964 | Lewis. |
| 3,272,014 | 9/1966 | Miks et al. |

FOREIGN PATENTS

| | | |
|---|---|---|
| 542,722 | 1/1932 | Germany. |

LOUIS R. PRINCE, Primary Examiner

HARRY C. POST III, Assistant Examiner

U.S. Cl. X.R.

73—419